Figure 1:
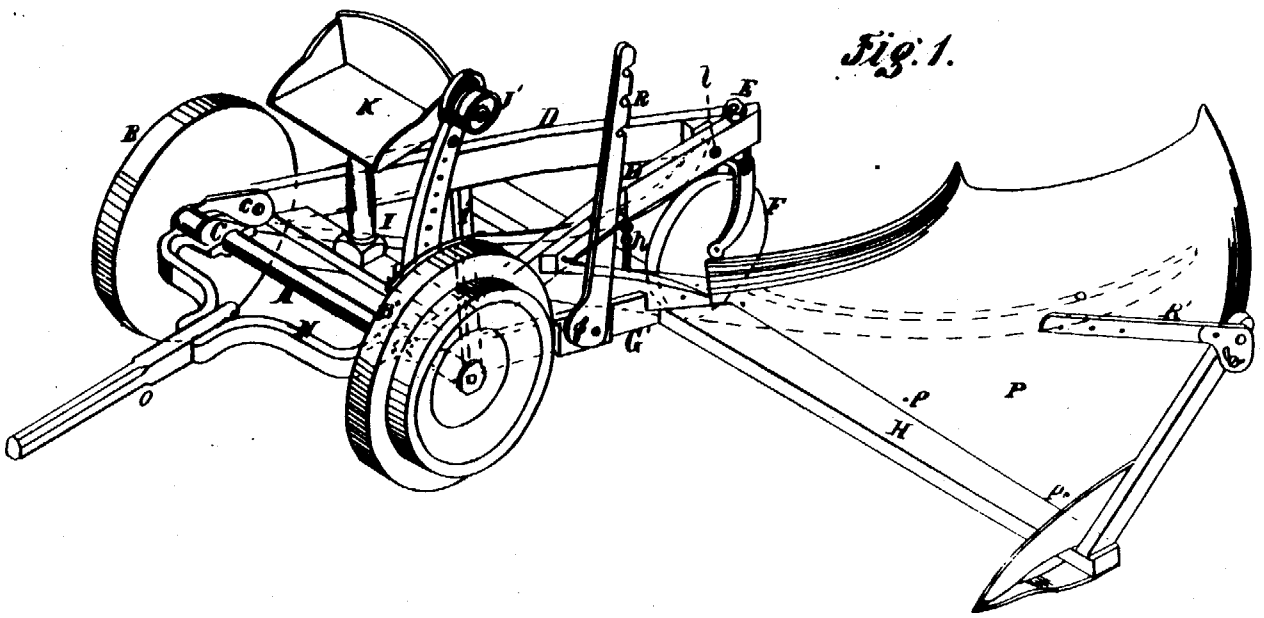

BEST AVAILABLE COPY

3. Sheets. Sheet. 1.

J. P. Manny,
Mower.

No. 3526

Reissued June. 29. 1869

Witnesses: { Joel Bystow, Battie De Long.

J. P. Manny
by his Atty
Wm. D. Adams

3. Sheets. Sheet 2.
J. P. Manny,
Mower.
No. 3526. Reissued. June 29. 1869.
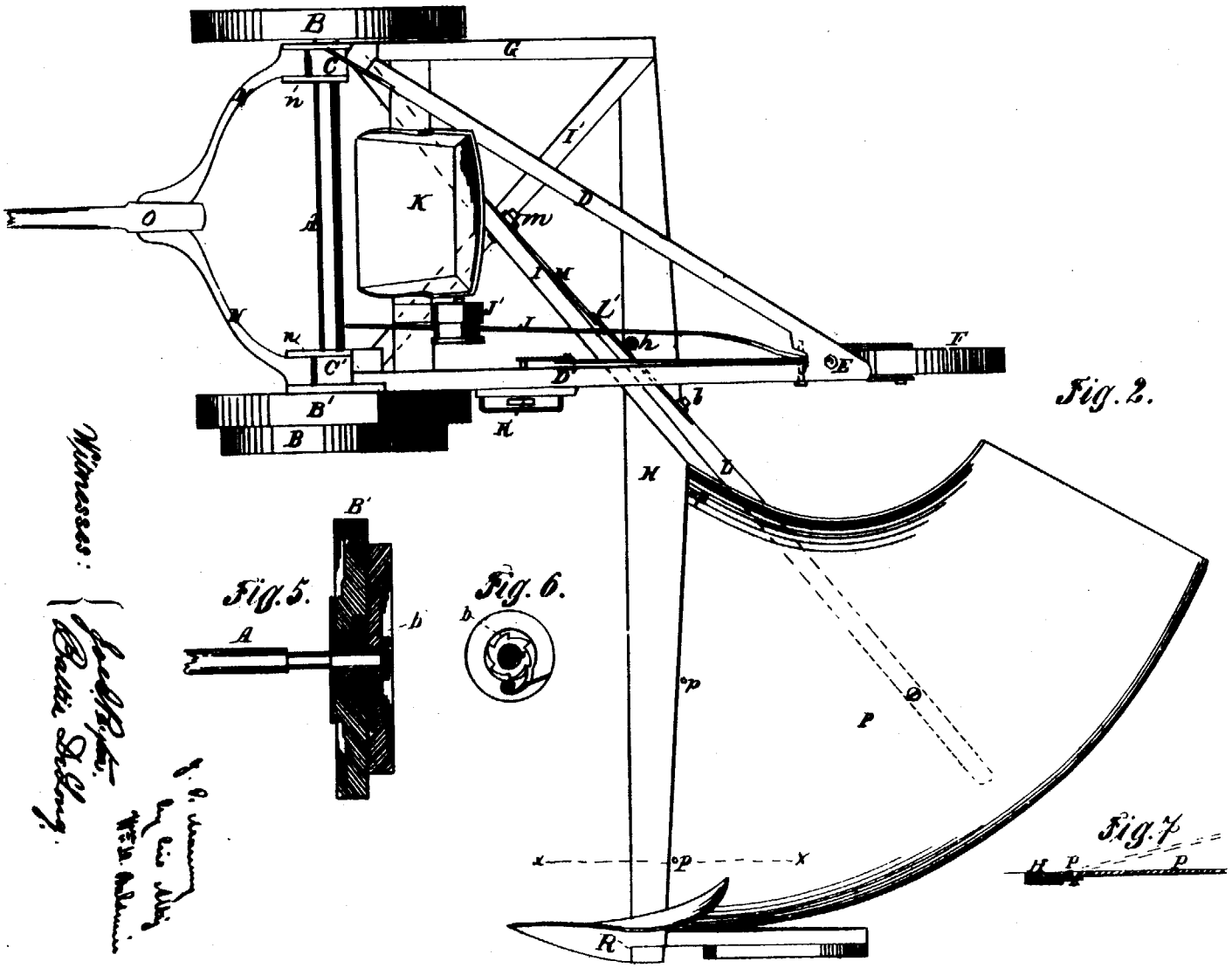
J. P. Manny
by his Atty
W. H. Salmon
Witnesses: { Joel R. Potter.
Battie DeLong.

3. Sheets Sheet 3.
J. P. Manny:
Mower.
No. 3526. Reissued June 29 1869.
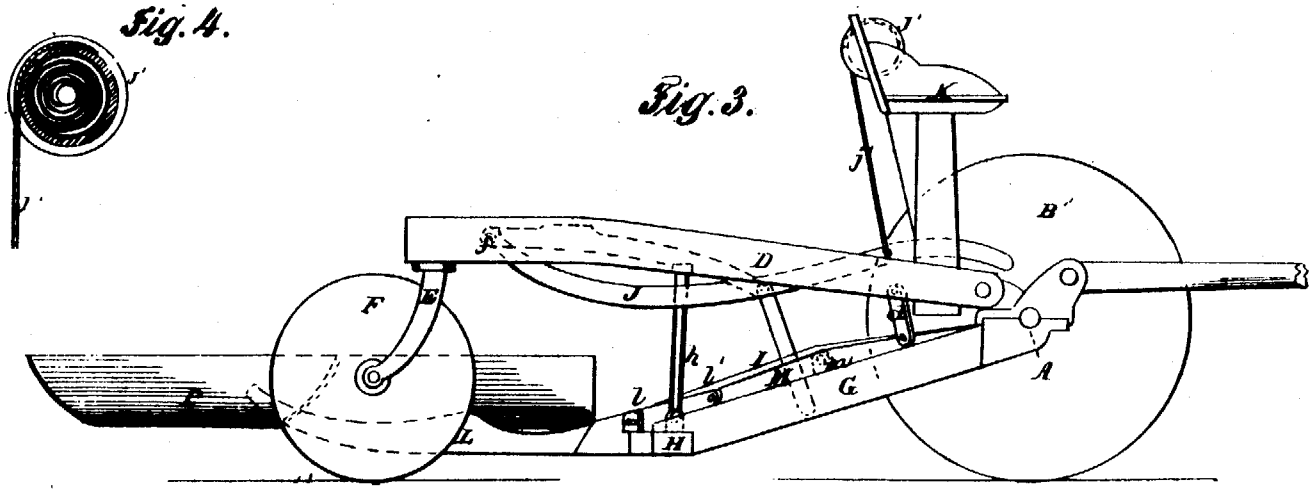
John P. Manny
by his Atty
Wm. D. Ashmun
Witnesses: Geo. H. Phyton
Cattia De Long

UNITED STATES PATENT OFFICE.

JOHN P. MANNY, OF ROCKFORD, ILLINOIS.

IMPROVEMENT IN HARVESTERS.

Specification forming part of Letters Patent No. 17,779, dated July 14, 1857; reissue No. 3,526, dated June 29, 1869.

DIVISION C.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The invention herein claimed relates to the use of the machine as a reaper; and the improvement consists, first, of the combination, substantially as hereinafter set forth, in a harvester, of two main wheels; a frame connected with the axle of the wheels in front, and supported at its rear end by a caster-wheel; a frame vibrating about the main axle; a laterally-projecting finger-beam, connected with the frame; and a platform to receive the cut grain vibrating with the finger-beam; second, the object of the next part of the invention is to keep the platform level while raising or lowering it; and the invention consists of the combination of a laterally-projecting finger-beam vibrating about the main axle, with a platform vibrating about the finger-beam, so as to raise its rear end when the finger-beam is lowered, and vice versa; third, the improvement further consists of the combination, in a two-wheeled harvester, of a laterally-projecting finger-beam vibrating about the main axle, with reel supports or standards, and a platform, both vibrating in unison with the finger-beam, and thus allowing the finger-beam to rise and fall without disturbing the relation of the finger-beam, reel-supports, and platform.

In the accompanying drawings, which make part of this specification, Figure 1 represents a view in perspective of so much of a harvester embracing my invention as is necessary to illustrate the improvements herein claimed. Fig. 2 represents a plan or top view of the same; Fig. 3, a view, in elevation, of the same as seen from the stubble side with the outer wheel removed; Fig. 4, a vertical section through a spring-drum, which is used for taking up a portion of the weight of the finger-beam, to prevent it from dragging too heavily on the ground; Fig. 5, a vertical transverse section through one of the driving-wheels; Fig. 6, a section showing one of the backing-ratchets; and Fig. 7, a vertical section through the platform at the line *x x* of Fig. 2.

An axle, A, supported on wheels B B′, turns freely in boxes or bearings C C′, to each of which one end of a piece, D D′, is respectively secured. The wheels likewise turn freely on the axle, with which they are connected by suitable backing-ratchets. The frame-pieces D D′ unite at their rear ends, and are supported by a caster-wheel, F, turning freely on its pivot or spindle E. Longitudinal side pieces G G′ are connected to the lower rear parts of the boxes C C′, in front, and are permanently attached in rear to a finger-beam, H, projecting laterally beyond the wheels and frame. Diagonal braces I I′ pass from corner to corner of the quadrangular frame formed by the main axle, the projecting extension of the finger-beam, and the side pieces G G′, and brace these parts firmly, while allowing them to vibrate or be adjusted around the axle A, as hereinafter described. A lever, J, is pivoted at *j* to the frame-piece D′, and extends to a point near the conductor's seat K, likewise mounted on the frame D D′, so that the driver can readily operate the lever to raise or lower the finger-beam, which is suspended from the lever by a rod, *h*, which passes loosely through an eye on the lever, to allow the finger-beam vertical play without moving the lever. The tongue O is connected to hounds N, hinged to the boxes C C′.

When these machines are used for mowing, the finger-beam is lowered, so as to move over, but in contact with, the ground, in order to cut close; but the friction produced by the dragging of the finger-beam is detrimental, by increasing the draft. This difficulty I obviate by mounting a spring-drum, J′, on a standard supported on the frame D D′, and connecting it by a cord or chain, *j′*, with the lifting-lever J, from which the finger-beam is suspended. One end of a coiled spring is fastened to the axis, and the other to the periphery of the drum, which is also provided with a ratchet and pawl, so that the spring may be wound up to and held at any desired degree of tension. The tension of the spring regulates the lifting-power applied to the lever J, and thus relieves the pressure of the finger-beam upon the ground, while allowing the crop to be closely cut.

For reaping, I attach a platform, P, to the finger-beam by hinges *p*, Fig. 7; but in raising or lowering this platform, I desire it always to retain the same horizontal position—or, in other words, to be raised and lowered in parallel lines, front and rear, which it would not do with the devices above described alone. To effect this object, therefore, I use a long lever or supporting-beam, L, which extends far under the platform, as shown in dotted lines in Fig. 2, and its outer end is fastened to the platform. This beam L is hinged to the finger-beam at *l*, and its front end is pivoted at *l'* to one end of a lever, M, which has its fulcrum at *m* on the diagonal brace I, while its front end is connected, by a link, *d*, with the frame D D'. The result of this arrangement is, that the supporting-piece L depresses the rear end of the platform as the finger-beam is raised by the lever J, and vice versa, the connection between the frame D D' and the supporting-piece L forming a compound lever to effect this purpose, and thus both the front and rear of the platform are kept in a horizontal position while they are raised or lowered to any desired cutting-height. The reel-arms or standards R R' are, respectively, mounted on and vibrating with the divider and the frame G G'.

The operation of the machine will readily be understood from the foregoing description. The team is harnessed to the tongue in the usual well-known way. The tongue, being pivoted to the boxes near the main axle, is free to vibrate up and down without affecting the movements of the other parts of the machine. The frame D D' is in like manner pivoted to the boxes, near the axle, and is also free to vibrate up and down around said pivots. The frame G G' is likewise connected with the boxes in which the main axle turns, and is free to vibrate up and down, to allow the finger-beam to conform to the undulations of the ground over which it slides when mowing. As the frame G G' is suspended by a link, *h*, from the lever J on the frame D D', the driver can raise or lower the finger-beam at pleasure, or hold it at any desired elevation. When reaping, he can, in like manner, raise and lower the platform, at the same time keeping it horizontal by means of the lever M and its linked connections with the frame D D'. As the driver's seat is mounted on the frame D D', the finger-beam and tongue can both vibrate up and down without rocking the seat back and forth on the axle. The reel-supports R R', being mounted on the vibrating frame G G' and the finger-beam, are free to vibrate in unison with the finger-beam around the main axle.

What I claim herein as my invention, and desire to secure by Letters Patent, is—

1. The combination, substantially as set forth, of two main wheels; a frame connected with the main axle in front, and supported by a caster-wheel in rear; a frame vibrating about the main axle; a laterally-projecting finger-beam connected with the frame; and a platform vibrating with the finger-beam.

2. The combination, substantially as set forth, of a laterally-projecting finger-beam vibrating about the main axle, with a platform vibrating about the finger-beam, so as to raise the rear end of the platform as the finger-beam is lowered, and vice versa, to keep the platform horizontal.

3. The combination, substantially as set forth, in a two-wheeled harvester, of a laterally-projecting finger-beam vibrating about the main axle, with reel-supports and a platform, both vibrating in unison with the finger-beam.

JOHN P. MANNY.

Witnesses:
THOMAS W. COLE,
SILAS G. TYLER.